(12) United States Patent
Luis y Prado

(10) Patent No.: US 9,862,088 B2
(45) Date of Patent: Jan. 9, 2018

(54) HYBRID MODULAR FIXTURING PLATFORM

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 14/881,068

(22) Filed: Oct. 12, 2015

(65) Prior Publication Data

US 2017/0100834 A1  Apr. 13, 2017

(51) Int. Cl.
| | | |
|---|---|---|
| *A47B 1/00* | (2006.01) | |
| *B25H 1/14* | (2006.01) | |
| *A47B 13/08* | (2006.01) | |
| *B23K 37/04* | (2006.01) | |
| *B25H 1/02* | (2006.01) | |
| *F16B 12/08* | (2006.01) | |

(52) U.S. Cl.
CPC ............. *B25H 1/14* (2013.01); *A47B 13/088* (2013.01); *B23K 37/0461* (2013.01); *B25H 1/02* (2013.01); *F16B 12/08* (2013.01)

(58) Field of Classification Search
CPC .... B23K 37/0461; A47B 13/088; F16B 12/08
USPC ................................................... 108/64, 181
See application file for complete search history.

(56) References Cited

U.S. PATENT DOCUMENTS

| | | | | |
|---|---|---|---|---|
| 4,061,323 A | * | 12/1977 | Beekenkamp | ............ B25B 1/12 269/139 |
| 5,341,749 A | * | 8/1994 | Noakes | ................ A47B 87/002 108/156 |
| 5,362,036 A | | 11/1994 | Whiteman | |
| 5,528,996 A | * | 6/1996 | Edwards | .............. A47B 13/021 108/158 |
| 5,794,545 A | * | 8/1998 | McDaniel | ............ A47B 87/002 108/64 |
| 5,924,684 A | * | 7/1999 | Cheng | ...................... B25H 1/04 269/139 |

(Continued)

FOREIGN PATENT DOCUMENTS

| | | |
|---|---|---|
| CN | 103522264 | 1/2014 |
| DE | 202009014342 | 4/2011 |

(Continued)

OTHER PUBLICATIONS http://www.stronghandtools.com/buildpro/accessories/individual_plates.php, BuildPro, Individual Plates, downloaded from the Internet, 2015.
Pictures of Stronghands table taken on or before Feb. 19, 2015, 2 pages.
Pictures of StrongHand table, taken at FABTECH Show, Las Vegas, Nevada, Nov. 18, 2016.
International Application No. PCT/US2016/056578, Notification of Transmittal of the International Search Report and the Written opinion of the International Searching Authority, dated Jan. 19, 2017, 8 pages.

(Continued)

*Primary Examiner* — Hanh V Tran
(74) *Attorney, Agent, or Firm* — Fish & Richardson P.C.

(57) ABSTRACT

Systems, method and apparatus for a fixturing platform having a frame assembly configured to couple to a support assembly with a plurality of surface plates configured to couple to the frame assembly in a number of configurations are described in this disclosure. The configurations include a continuous configuration with abutting surface plates forming a continuous working surface and a spaced configuration with spaced surface plates forming a spaced working surface, the spaced configuration have one or more working gaps between surface plates.

17 Claims, 19 Drawing Sheets

(56) References Cited

U.S. PATENT DOCUMENTS

| | | | | |
|---|---|---|---|---|
| 5,988,077 A * | 11/1999 | Balderi | ............... | A47B 87/002 |
| | | | | 108/64 |
| 6,019,359 A * | 2/2000 | Fly | ................... | B23K 37/0461 |
| | | | | 269/289 R |
| 8,042,794 B2 * | 10/2011 | Marshall | ................. | B25H 1/04 |
| | | | | 269/136 |
| 8,065,967 B2 * | 11/2011 | Wong | ............... | B23K 37/0461 |
| | | | | 108/155 |
| 8,550,015 B2 * | 10/2013 | Wright | ................... | A47B 3/06 |
| | | | | 108/156 |
| 9,636,786 B2 * | 5/2017 | Tsui | .................. | B23K 37/0461 |
| 2004/0140412 A1 * | 7/2004 | Hendzel | ................. | F16M 1/00 |
| | | | | 248/440 |
| 2015/0075410 A1 * | 3/2015 | Wong | ................... | B23K 26/38 |
| | | | | 108/28 |
| 2015/0174705 A1 * | 6/2015 | Schwartz | ............ | B23K 26/422 |
| | | | | 219/121.67 |

FOREIGN PATENT DOCUMENTS

| | | |
|---|---|---|
| KR | 101472109 | 12/2014 |
| RU | 2445201 | 3/2012 |

OTHER PUBLICATIONS

Workshops for Warriors table shipped to Stronghands, on or about Oct. 13, 2015, 2 pages.
Workshops for Warriors table at FABTECH Show, Las Vegas, Nevada, on or about Nov. 10, 2015, 5 pages.

\* cited by examiner

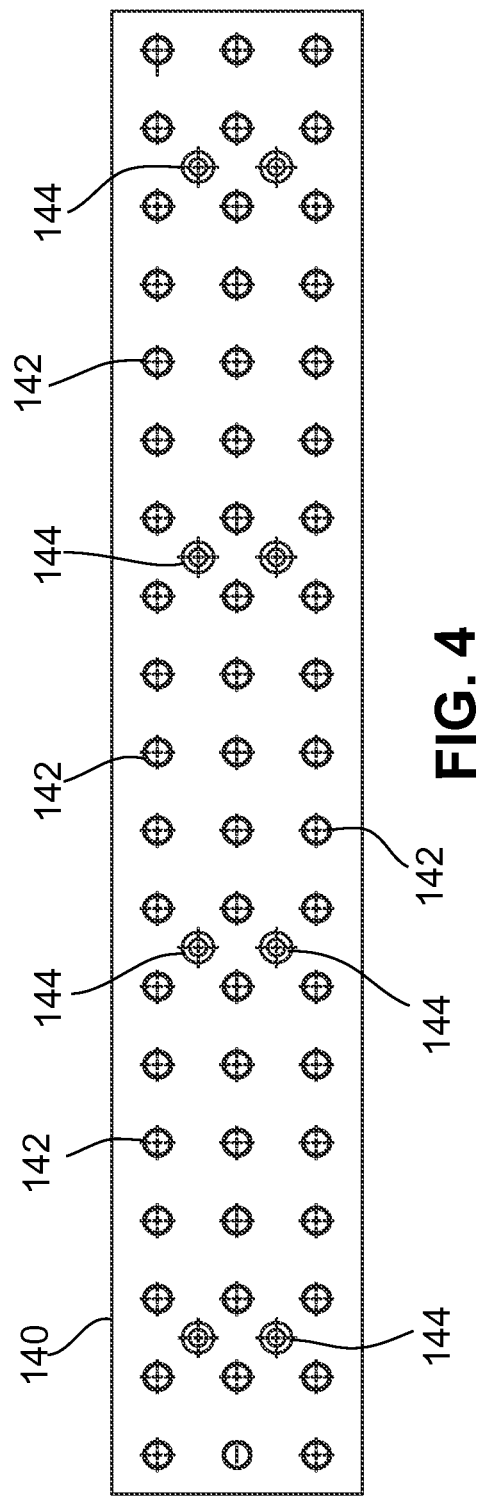

HYBRID MODULAR FIXTURING PLATFORM

BACKGROUND

Welding tables are used to secure work pieces for welding. A welding table typically has a surface with an array of holes to hold fixturing and other tools. The fixturing tools hold work pieces in alignment during welding. In this way, welding tables allow complex work pieces to be efficiently welded.

SUMMARY

In general, one innovative aspect of the disclosure can be embodied in a fixturing platform having a frame assembly configured to couple to a support assembly. A plurality of surface plates may be configured to couple to the frame assembly in a number of configurations. The configurations include a continuous configuration with abutting surface plates forming a continuous working surface and a spaced configuration with spaced surface plates forming a spaced working surface, the spaced configuration having one or more working gaps between surface plates.

In one aspect, the configurations may also include a hybrid configuration with a plurality of abutting surface plates and at least one spaced surface plate forming a hybrid working surface. The frame assembly may comprise a plurality of continuous bars configured extending from a first edge to a second edge of the frame assembly. The surface plates may be configured to be coupled to the continuous bars at any location along the length of the continuous bars.

In another aspect, the frame assembly may comprise a frame and a plurality of modular mounting brackets interchangeable without modification. The modular mounting brackets may be configured to couple the frame to the support assembly. The support assembly may include a plurality of leg assemblies each comprising a leg welded to a modular leg mounting bracket. In this embodiment, each modular let mounting bracket may be welded to a leg and configured to secure to one of the modular mounting brackets of the frame assembly with a fastener at each of a plurality of attachment points.

The fixturing platform may comprise a table or supported surface such as a welding table, an assembly table, a milling or other machining table, an inspection table, a quality control table, a transport platform for fixturing heavy or bulky loads for movement between stations, a computer numerically controlled (CNC) platform, a solidsworks table and/or a painting table. Advantages of one or more embodiments may include a rigid table or platform with an accurate array of fixturing holes, or points. Other advantages of some embodiments include providing a working surface that may be re-configured to form a continuous, spaced or hybrid working surface. Also, in some embodiments, a number of pieces may be modular and used for several functions to reduce cost.

Details of one or more aspects of the disclosure are set forth in the accompanying drawings and the description below. Other features, objects, and advantages of the disclosure will be apparent from the description and drawings, and from the claims.

DESCRIPTION OF DRAWINGS

FIG. 3A is front view, FIG. 3B a side view, FIG. 3C a top view, and FIG. 3D a bottom view.

FIG. 4 is a top view of a surface plate of the hybrid modular welding table.

FIG. 5A shows a continuous working surface, FIG. 5B a spaced working surface, and FIG. 5C a hybrid working surface.

FIG. 7A is a bottom view that shows a stored position and a deployed position of side connector brackets, FIG. 7B is a bottom view that shows a stored position and a deployed position of front and back connector brackets, and FIG. 7C is an isometric view that shows various locations of the modular connector brackets.

FIG. 8A is an isometric view of the extended hybrid modular welding table with surface plates removed, FIG. 8B is a bottom view of the extended hybrid modular welding table with surface plates removed, and FIG. 8C is an isometric view of the extended hybrid modular welding table with surface plates forming an extended continuous working surface.

FIG. 9A is an isometric view of the extended hybrid modular welding table with surface plates removed, FIG. 9B is a bottom view of the extended hybrid modular welding table with surface plates removed, and FIG. 9C is an isometric view of the extended hybrid modular welding table with surface plates forming an extended continuous working surface.

FIG. 10A is an isometric view, FIG. 10B a top view, and FIG. 10C a front view.

FIG. 11A is a perspective view from a first angle, FIG. 11B a perspective view from a second angle, FIG. 11C a front view, and FIG. 11D a side view.

Like reference symbols in the various drawings indicate like elements.

DETAILED DESCRIPTION

Figure 1:
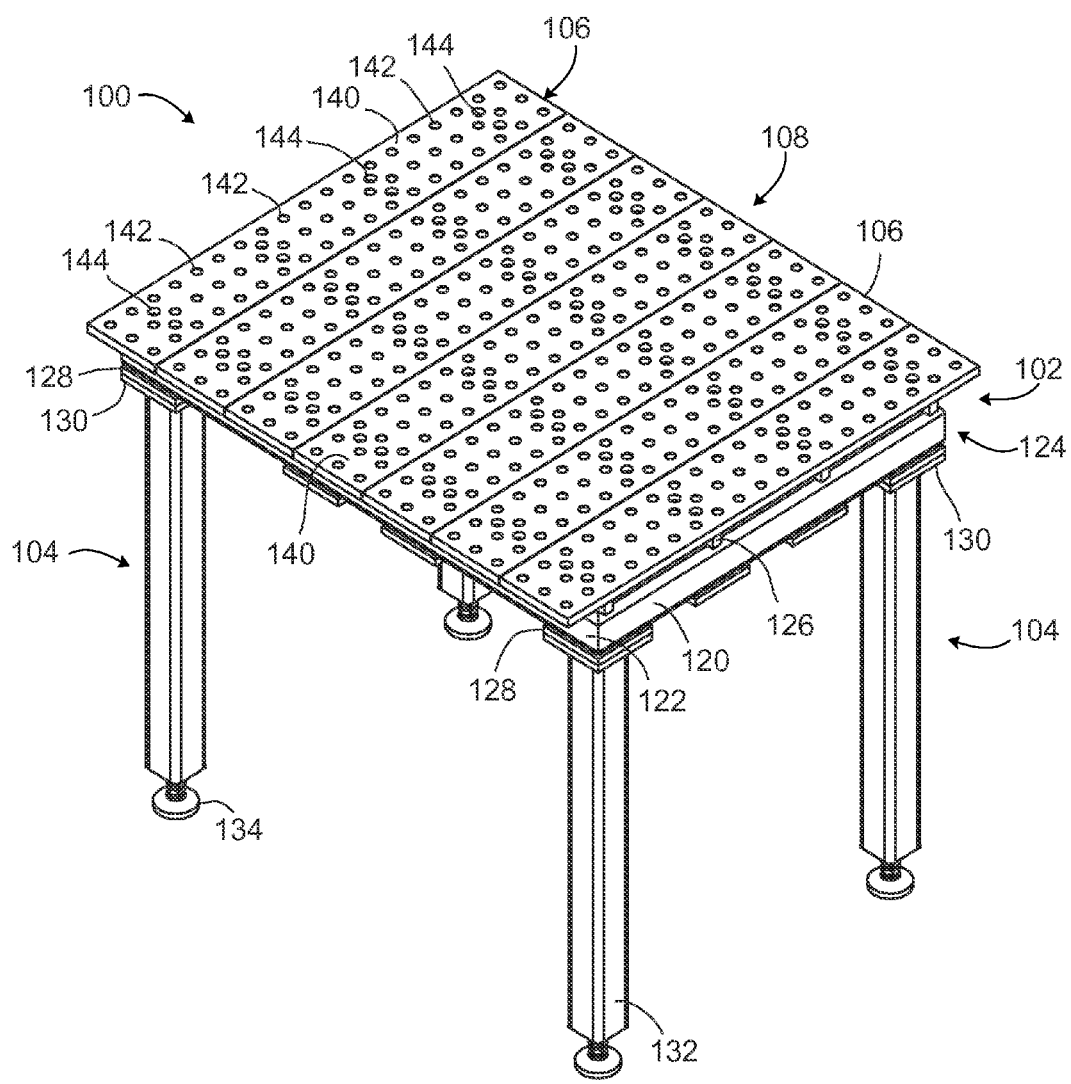
FIG. 1 is an isometric view of a hybrid modular welding table.

FIG. 1 illustrates a hybrid modular fixturing platform 100. The hybrid modular fixturing platform 100 may comprise, for example, a table or supported surface such as a welding table, an assembly table, a milling or other machining table, an inspection table, a quality control table, a transport platform for fixturing heavy or bulky loads for movement between stations, a computer numerically controlled (CNC) platform, a solidsworks table and/or a painting table. While the hybrid modular fixturing platform 100 will be described generally as a welding table, it may be as any suitable platform to fixture work pieces for work. For example, the hybrid modular fixturing platform 100 may comprise a working surface supported on a rotisserie, or rotary positioner as described in FIGS. 11A-11D.

As discussed in more detail below, the hybrid modular welding table 100, in one aspect, allows the working surface to be configured to a number of configurations. In another aspect, the hybrid modular welding table 100 allows the use of modular brackets for attaching components to the table, including, for example, the legs, other welding tables, off-table workspaces and/or other suitable attachments and accessories. In still other aspects, the hybrid modular welding table 100 may be rigid, provide an accurate grid pattern for precise fixturing of work pieces for welding at tight tolerances, be stable and/or reduce vibration. The hybrid modular welding table 100 may also be portable. In some embodiments, the welding table may be implemented as a hybrid non-modular table or as a modular non-hybrid table.

Referring to FIG. 1, hybrid modular welding table 100 comprises a frame assembly 102, a plurality of leg assemblies 104, and a plurality of surface plates 106 forming a working surface 108. In the illustrated embodiment, the surface plates 106 touch, are immediately next to, or abut each other to form a continuous working surface 108. The continuous working surface 108 is a working surface without appreciable gaps or, for example, gaps of less than a half inch, a quarter inch, 10 centimeters, or 5 centimeters. The surface plates 106 may instead be secured to the frame assembly 102 in a spaced configuration or a hybrid configuration.

The frame assembly 102 has a plurality of side members 120 and a plurality of cross members 122 forming a frame 124. The side and cross members 120 and 122 may together comprise the edge members of the frame assembly. The edge members may be welded together to form a rigid frame 124.

A plurality of bars 126 extend from edge to edge, or longitudinally in one embodiment, across the frame 124. The bars 126 may be continuous along their length to enhance spacing flexibility of the continuous, spaced and hybrid working surface configurations. In other embodiments, the bars 126 may be discontinuous and/or comprise a plurality of members. The bars 126 may extend on top of or in connection with the cross members 122 of the frame 124 as illustrated or may be offset from the cross members 122, comprise additional or fewer bars 126 than cross members 122. For example, two bars 126 may be used in a particular embodiment. In another embodiment, the cross members 122 or other part of the frame 124 may also serve as or be the bars 126, eliminating the need for separate bar structures. Thus, the surface plates 106 may be directly or otherwise connected to the cross members 122 or other part of the frame 124. For example, the cross bars 122 may be threaded and fasteners used to attached surface plates 106 to the cross members 122.

The bars 126 may be rectangular tubes and threaded as in the illustrated embodiment. In other embodiments, the bars may not be threaded and/or may be solid. Thus, the bar 126 may be smooth, comprise bossing or other surface features for securing and/or positioning the surface plates 106. The bars 126 will be generally described as threaded bars 126.

A plurality of modular mounting brackets 128 may be coupled to the frame 124. An element may be coupled to another element when directly or indirectly connected to the other element. Elements may be connected or otherwise coupled by welding, fastening, screwing, bolting together the elements, or other elements connected to the elements. The modular mounting brackets 128 may be interchangeable without modification to allow attachment of leg members 104 as well as other components. In the illustrated embodiment, the modular mounting brackets 128 may be modular plates welded to the bottom of the frame 124.

The leg assemblies 104 may each comprise a modular leg mounting bracket 130, a leg 132, and a foot 134. Each leg 132 may be welded to one of the modular leg mounting brackets 130, and each modular leg mounting bracket 130 may be fastened to a corresponding modular mounting bracket 128. In one embodiment, the modular leg mounting bracket 130 may comprise a mounting flange and the modular mounting bracket 128 a mating bracket. The modular mounting brackets 128 and 130 may be a same size and include corresponding holes for attaching the legs 132 to the frame assembly 102. However, in one embodiment, the modular mounting brackets 128 comprise threaded holes while the modular leg mounting brackets 130 comprise through holes such that fasteners such as bolts may pass through the modular leg mounting brackets 130 to secure modular mounting brackets 128. Thus the modular leg mounting brackets 130 and modular mounting brackets 128 may be interchangeable without modification prior to drilling or forming their respective holes and/or have a same size and attachment points.

Each leg 132 may comprise a tube, such as a square tube. The foot 134 may be threaded into the leg 132 or otherwise coupled to the leg 132. In the embodiment where the foot is threaded, it may be vertically adjustable to level the hybrid welding table 100. The foot 134 may comprise a leveling swivel (be self-leveling) or, for example, comprise a caster to allow the hybrid modular welding table 100 to be easily moved and secured in place with caster brakes.

The surface plates 106 may each comprise a slat 140 with a plurality of fixturing holes 142 and attachment points 144. The fixturing holes 142 are configured to receive and hold fixturing tools and may be through holes. The attachment points 144 may comprise recessed holes to allow the surface plates to be removably fastened on to the bars 126 of the frame assembly 102. The attachment points 144 may align with attachment points, or threaded holes in one embodiment, or on the bars 126 for a plurality of working surface configurations.

Figure 2A:
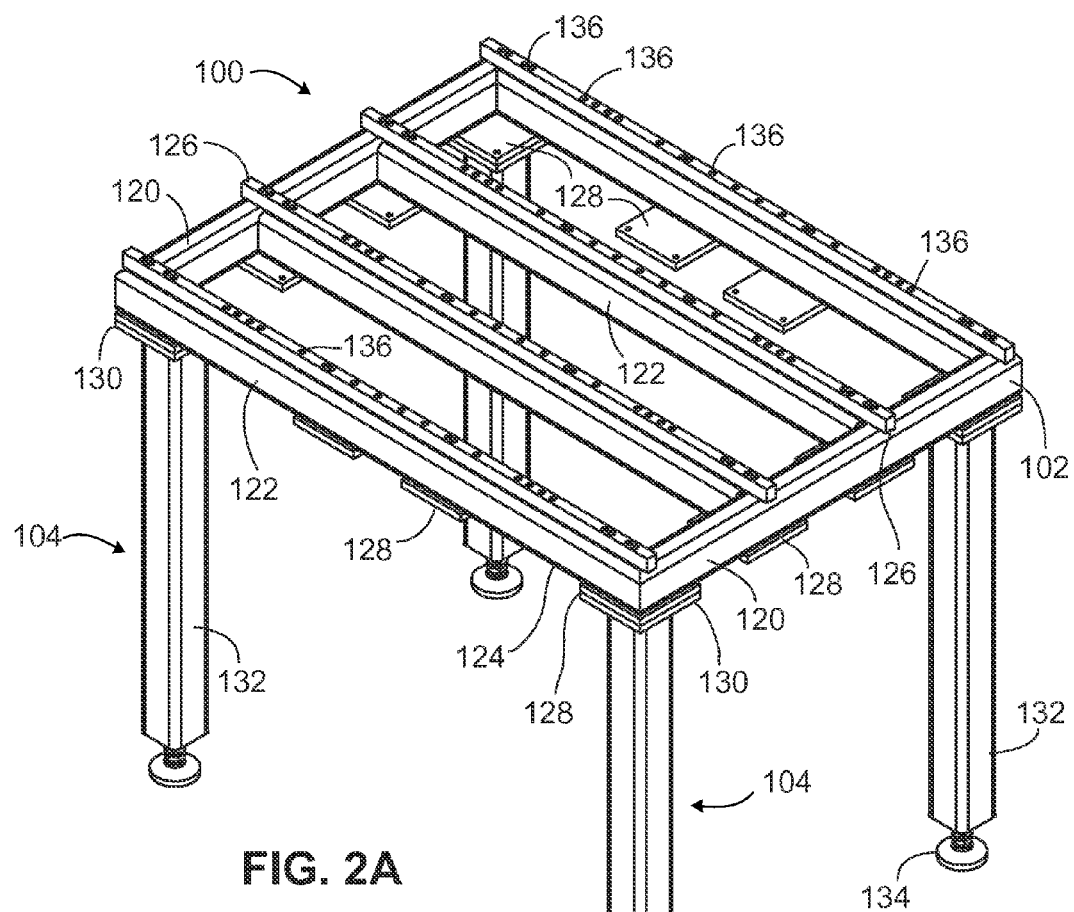
FIGS. 2A-2B are various views of the hybrid modular welding table with surface plates removed to show details of the frame assembly.

FIG. 2A illustrates the hybrid modular welding table 100 with the surface plates 106 removed. Referring to FIG. 2A, the side members 120 and cross members 122 of the frame 124 may be 2 inch by 4 inch rectangular tubes. Other suitably sized end members 120 and cross members 122 may be used. In the illustrated embodiment, the frame 124 comprises two end members 120 and four cross members 122. The frame 124 may comprise fewer, additional or other members. The end members 120 and cross members 122 may comprise steel or other suitable material and be welded together to enhance rigidity. It will be understood that the members of the frame 124 may be otherwise fastened, secured or connected together.

The threaded bars 126 may be ¾ inch×¾ inch square tubes. The threaded bars 126 may have a milled surface to be uniform within, for example, a thousandths or a few thousandths of an inch. The threaded bars 126 may be comprised of steel or other suitable material and be welded to the end members 120 and cross members 122 of the frame 124 to enhance rigidity. It will be understood that fewer or additional threaded bars 126 may be provided and that the threaded bars 126 may be otherwise fastened, secured or connected to the frame 124.

The threaded bars 126 include a plurality of attachment points, or in the illustrated embodiment, threaded holes 136 for attachment of the surface plates 106. The threaded holes 136 are spaced, in one aspect, to allow the plates 106 to be positioned in a continuous workspace configuration, a spaced workspace configuration, or hybrid workspace configuration. Spacing of the threaded holes 136 may be as described below in connection with FIG. 3C. The continuous workspace configuration, spaced workspace configuration, and hybrid workspace configurations are described below in connection with FIGS. 5A-5C.

The modular mounting brackets 128 may be 5 inch×5 inch plates of half inch thick steel or other suitable material. In the illustrated embodiment, the frame assembly 102 comprises twelve modular mounting brackets 128, one at each corner of the frame 124 and two additional ones on each edge (front, back and sides) for attachment of other components to the hybrid modular welding table 100. The modular mounting brackets 128 may be welded to the frame 124 to enhance rigidity.

Fewer, additional or different modular mounting brackets 128 may be provided. In addition, the modular mounting brackets 128 may be otherwise fastened, secured or connected to the frame 124. Further, for example, some of the modular mounting brackets 128 may be combined into a single bracket such as along the edges of the frame assembly 102. Further details of the modular mounting brackets 128 are described in connection with FIGS. 3A-3C.

The frame assembly 102 may be supported, or held in spaced relation with a floor or other surface, by four leg assemblies 104. The leg 132 of each leg assembly 104 may be 4 inch×4 inch square tube of steel or other suitable material to enhance rigidity. The leg assemblies 104 may be removably fastened to corresponding modular mounting brackets 128 of the frame assembly 102. In one embodiment, the leg assemblies 104 may be bolted to the frame with a bolt at each of a plurality of attachment points. For example, four bolts may be used in one embodiment to enhance rigidity. The multiple points of attachment between the brackets 128 and 132 in connection with the welding of the leg 132 to the bracket 130 provides rigid connection between the leg assemblies 104 and the frame assembly 102. The rigid connection may be highly or completely inflexible under normal loads. It will be understood that fewer or additional leg assemblies 104 may be provided and that the leg assemblies 104 may be otherwise fastened, secured, coupled or connected to the frame assembly 102.

Figure 2B:
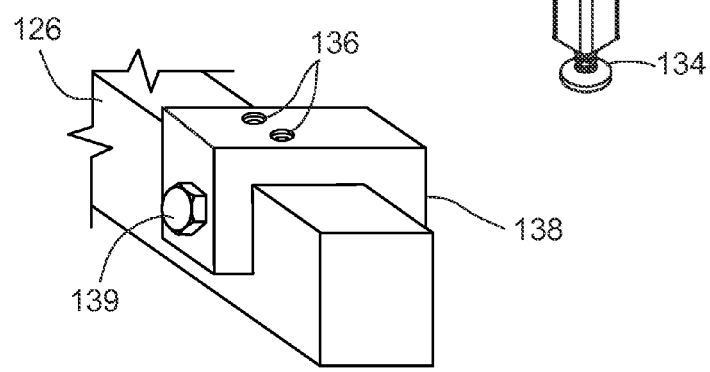

FIG. 2B illustrates an embodiment of the hybrid modular welding table 100 with threaded holes 136 for attachment of the surface plates 106 disposed in brackets 138 rather than directly on the bar 126. In this embodiment, the bar 126 may be smooth and rectangular. The bar 126 may in this embodiment have one or more grooves or other surface features for retaining the bracket 138 and/or aiding positioning of the bracket 138 along the bar 126. As described above, the cross members 122 may also serve as the bars 126. In this embodiment, the brackets 138 may directly or otherwise attach to the cross members 122 or other part of the frame 124.

Referring to FIG. 2B, the bracket 138 may comprise a slideable bracket 138 coupled to the bar 126. In this embodiment, the slideable bracket 138 may ride directly on the bar 126. The slideable bracket 128 may comprise bearings or other elements to aid slideability along, positioning relative to and/or securely to the bar 126. In the illustrated embodiment, the slideable bracket 138 comprises a C-shaped bracket with the threaded holes 136 along a top for fastening of the surface plates 106. A fastener 139, such as a bolt or screw, may be threaded within and pass through the slideable bracket 138 to secure, clamp and/or lock the slideable bracket 138 to the bar 126 at any location or position along the bar 126. An element may be locked in place when it is fixed, clamped, or otherwise secured such that it does not move or does not move in normal use or operation of the platform. The slideable bracket 138 may be otherwise secured and/or positioned to the bar 126. For example, a U-shaped bracket may be used with the U of the bracket 138 under the bar 126 (in this embodiment the bars 126 are offset or spaced from the cross members 122) and tightened to the bar 126 when fasteners inserted through the surface plates 106 are tightened into threaded holes 136 on the top/ends of the U-shaped bracket 138. Other suitable friction, clamping or other securement devices may be used.

Figure 3A:
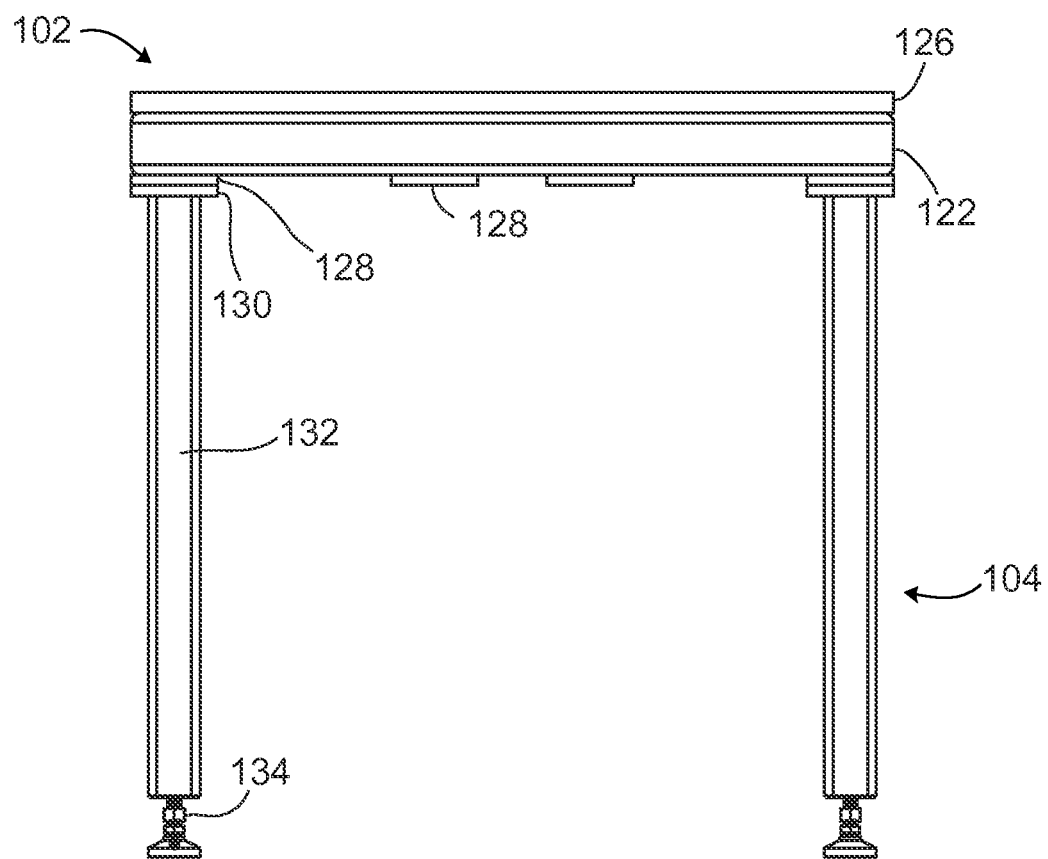
FIGS. 3A-3D are various views of the hybrid modular welding table with surface plates removed.

FIGS. 3A-3D are various views of the hybrid modular welding table 100 with the surface plates removed. FIG. 3A is a front view showing a threaded bar 126 attached to a cross member 122. In this configuration, the threaded bar 126 and the cross member 122 may have the same length. In other configurations, the threaded bar 126 and cross member 122 may have different lengths. For example, the threaded bar 126 may be shorter or longer then the cross member and may, for example, terminate at least proximate to the cross member 122. The modular mounting brackets 130 of the leg assemblies 104 are attached to the modular mounting brackets 128 of the frame assembly 102. In the illustrated embodiment, the distance from the top of the threaded bar 126 to the bottom of the leg 132 may be 34.1 inches with a spacing of 36 inches between the legs 132 along the front (and back) of the table 100.

Figure 3B:
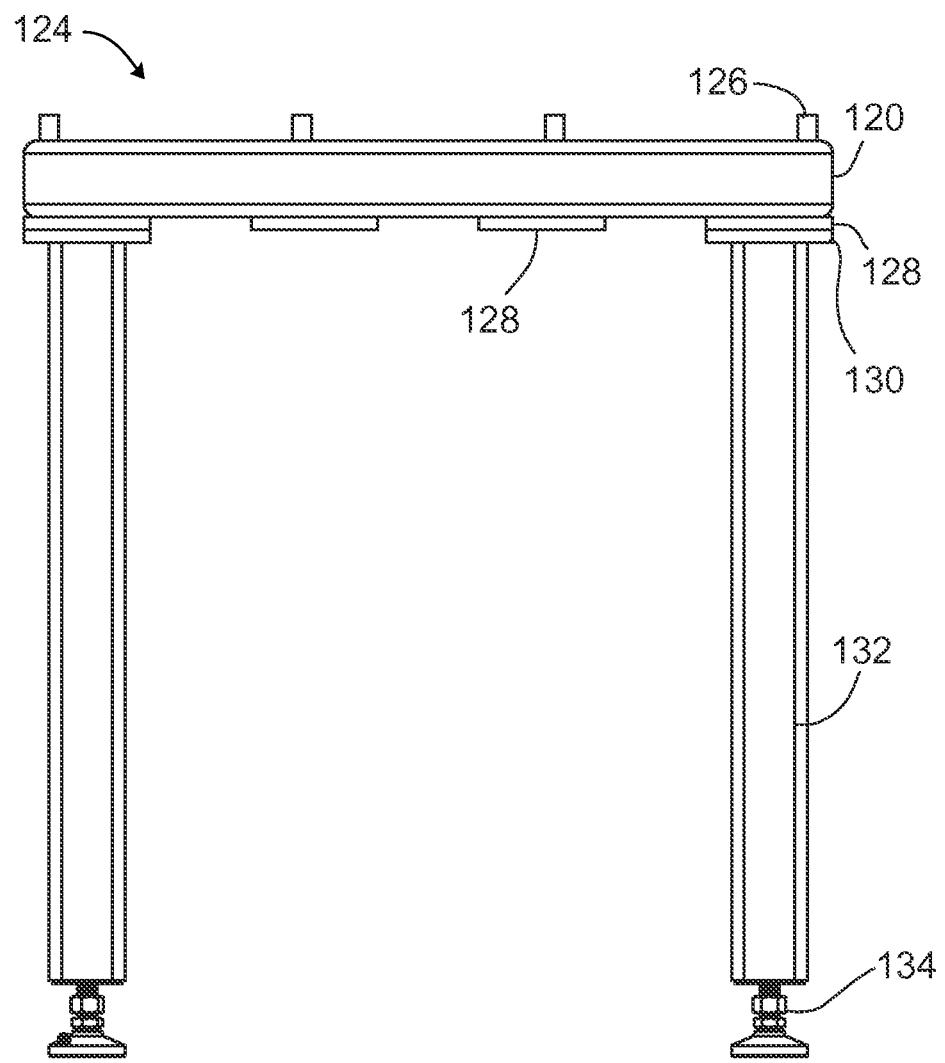

FIG. 3B is a side view showing four threaded bars 126 attached to a side member 120. The side member 120 and cross members of the frame 124 support the threaded bars 126, which in turn support the surface plates 106 of the working surface 108 (of FIG. 1). The frame 124 may comprise other, different or fewer elements. In the illustrated embodiment, the distance from the top of the threaded bar 126 to the bottom of the leg 132 may be 34.1 inches with a spacing of 24 inches between the legs 132 along the sides of the table.

Figure 3C:
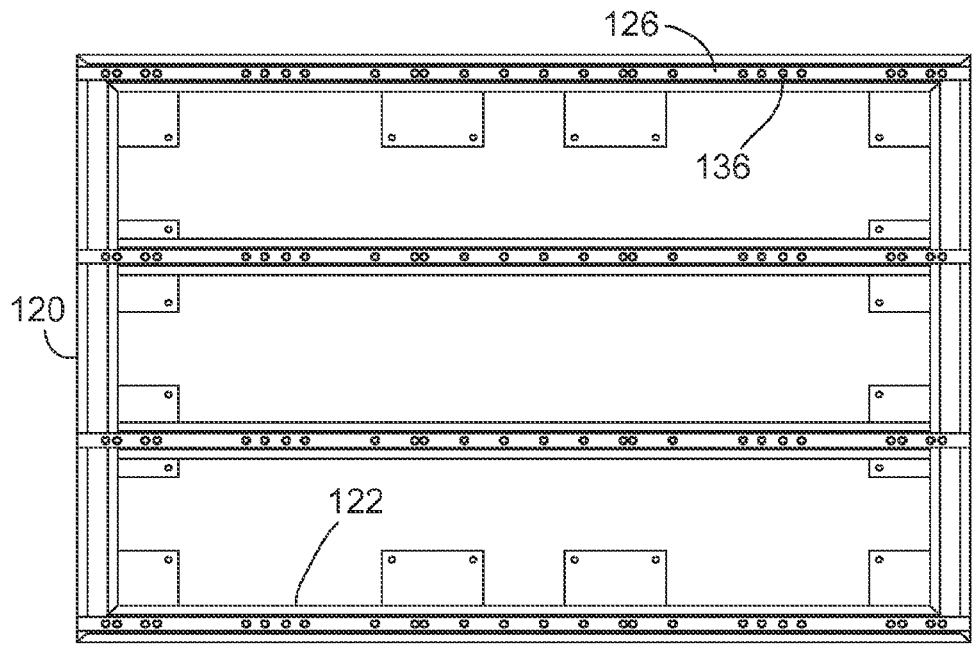

FIG. 3C is a top view of the hybrid modular welding table 100 with the surface plates removed showing the location or spacing of the threaded holes 136 of the threaded bar 126. The threaded holes 136 may be located to align with the attachment points, or holes, 144 of the surface plates 106 in one, more or all of the continuous workspace configuration, the spaced workspace configuration and/or the hybrid workspace configuration. Thus, the location and spacing of the threaded holes 136 may vary with the dimensions of the surface plates 106 and location of the attachment points 144.

Exemplary spacing of the threaded holes 136 from left to right in the illustrated embodiment is listed in Table 1. In this embodiment, the frame 124 may be 32 inches×44 inches, the threaded bars 126 may be 44 inches in length and spaced 10 inches apart center bar to center bar. The threaded holes 136 may each be ⅜ inch-16 UNC.

TABLE 1

| Hole Number | Location |
| --- | --- |
| #1 | 1.393 |
| #2 | 1.966 |
| #3 | 3.361 |
| #4 | 3.934 |
| #5 | 8.316 |
| #6 | 9.242 |
| #7 | 10.284 |
| #8 | 11.210 |

TABLE 1-continued

| Hole Number | Location |
|---|---|
| #9 | 14.666 |
| #10 | 16.634 |
| #11 | 17.091 |
| #12 | 19.060 |
| #13 | 21.016 |
| #14 | 22.984 |
| #15 | 24.940 |
| #16 | 26.909 |
| #17 | 27.366 |
| #18 | 29.334 |
| #19 | 32.790 |
| #20 | 33.716 |
| #21 | 34.758 |
| #22 | 35.684 |
| #23 | 40.066 |
| #24 | 40.639 |
| #25 | 42.034 |
| #26 | 42.607 |

Figure 3D:
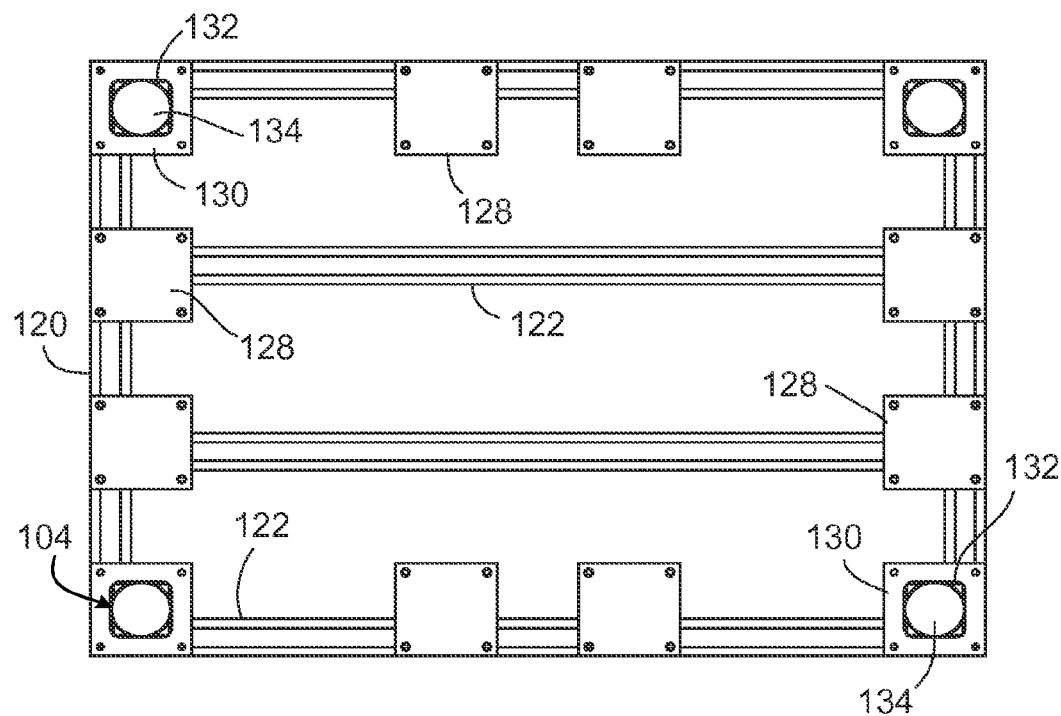

FIG. 3D is a bottom view of the hybrid modular welding table 100 with the surface plates removed. In the illustrated embodiment, the legs 132 of the leg assemblies 104 are attached to the modular leg mounting brackets 130 which are each bolted with four bolts to the modular mounting bracket 128. In other embodiments, the leg assemblies 104 may be omitted and the frame assembly 102 with surface plates 106 used as a welding or other platform coupled to, for example, a support or movable bed.

In the illustrated embodiment, the modular mounting brackets 128 interior to the corners on each edge may be spaced 4 inches from each other, with 34 inches between the corner modular leg mounting brackets 130 on the front and back, and 22 inches between the modular leg mounting brackets 130 on the sides. Each modular leg mounting bracket 130 comprises four ⅜ inch through holes with the modular mounting brackets 128 each comprising four ⅜-16 UNC holes. One or more of the mounting brackets may be omitted or combined with another mounting bracket. Thus, for example, a single interior mounting bracket 128 may be provided on each edge.

FIG. 4 is a top view of the surface plate 106 of the hybrid modular welding table 100. In one embodiment, each surface plate may comprise a slat 140 that is flat, level or substantially flat or level. The slat 140 may be steel and be 38 inches by 6.299 inches and 0.630 inches thick. The slat 140 may have other dimensions, configurations and be made of other suitable materials.

Referring to FIG. 4, the fixturing holes 142 may each be 0.625 inches in diameter and be offset 2 inches center hole to center hole to form an array of 57 fixturing holes on each surface plate 106 and the working surface 108. The fixturing holes 142 may have other suitable dimensions and be otherwise spaced. For example, the fixturing holes 142 may have a uniform or non-uniform longitudinal distribution across the workspace 108 when the plates 106 are in a continuous configuration.

The attachment holes 144 may each be 0.787 inches in diameter, and may be positioned in four sets of two, one set to attach to each threaded bar 126. The sets, or pairs, may be offset 10 inches center hole to center hole with each other and the holes of each set offset 1.969 inches center hole to center hole. Each attachment hole 144 may be recessed, with an upper portion comprising a 0.787 diameter to a depth of 0.413 inches. The attachment holes 144 may also have other suitable dimensions. For example, the location and spacing of the attachment holes 144 may vary based on the location and spacing of the threaded holes 136 or attachment points of the frame assembly 102.

Figure 5A:
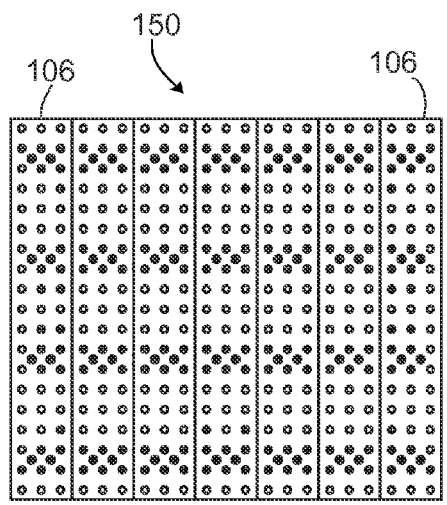
FIGS. 5A-5C are top views of the various surface plate configurations of the hybrid modular welding table.
Figure 5B:
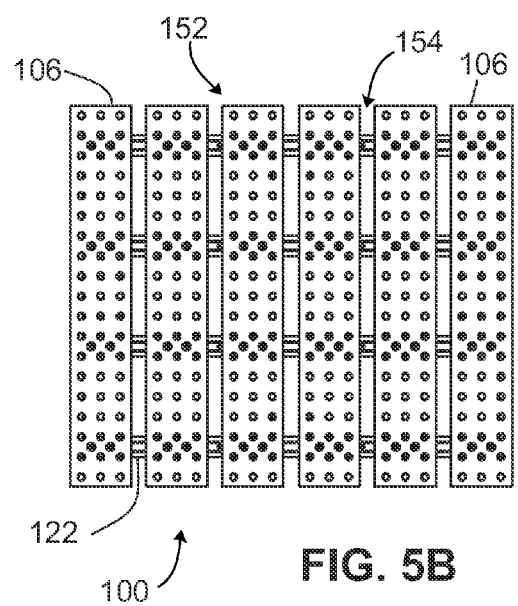
Figure 5C:
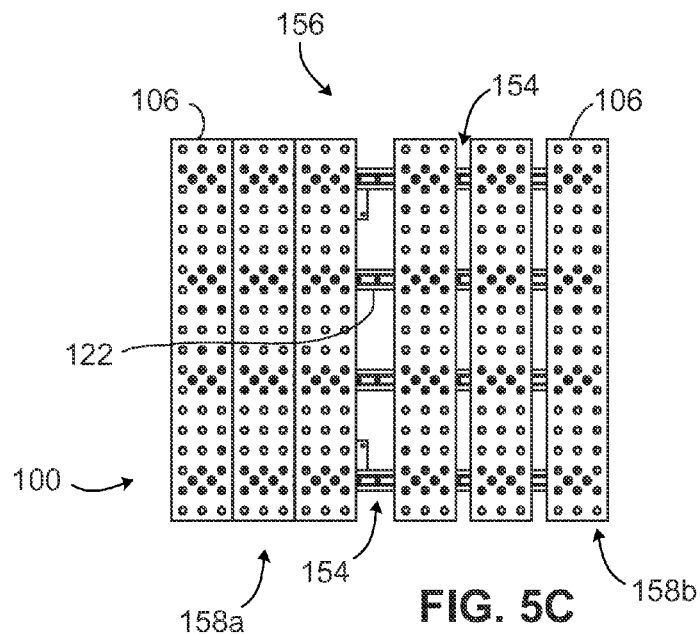

FIGS. 5A-5C are top views of various plate spacing configurations of the hybrid modular welding table 100 which allow alternative working surfaces 108. Thus, the working surface can be set to one configuration and freely changed to other configurations as needed.

FIG. 5A shows a continuous working surface 150. In this configuration, the surface plates 106 are secured or connected to the frame assembly 102 to be next to, touching, abutting, or in close proximity to each other such that the working surface 108 is continuous in that the fixturing holes are substantially uniform and/or no appreciable gaps exist between the plates 106. A continuous working surface 150 may be preferred when gaps are not needed and/or additional or a maximum number of fixturing tool holes are desired.

FIG. 5B shows a spaced working surface 152 for the hybrid modular welding table 100. In this configuration, the surface plates 106 are secured or connected to the frame assembly with grooves or gaps 154 between the surface plates 106 such that the working surface 152 is not continuous and work pieces and/or fixturing tools may be positioned between the surface plates 106. In the illustrated embodiment, the gap 154 may be a non-nominal working gap 154 less than 6 inches and/or the width of a surface plate 106. The working gap fits portions of work pieces or fixturing tools below the working surface 108. For example, the working gap 154 may be 5 inches, 4 inches, 3 inches, 2.5 inches, 2 inches or 1.5 inches between surface plates 106. The hybrid modular welding table 100 may be configured for configurations of other suitable gaps 154 and/or several alternative gaps 154. A spaced working surface 152 may be preferred to save cost by reducing the number of surface plates 106 or to fit portions of work pieces or fixturing tools below the working surface 108.

FIG. 5C shows a hybrid working surface 156 for the hybrid modular welding table 100. In this configuration, the surface plates 106 are secured to the frame assembly with at least two surface plates 106 continuous and at least one gap 154 between two surface plates 106 and/or with mixed gap spacing. In one aspect, two or more of the surface plates 106 may form a continuous section 158a of the hybrid working surface 156 while at least one, two or more other surface plates 106 form a spaced section 158b of the working surface 156. In this configuration, several gaps 154 may exist in the working surface.

Figure 6:
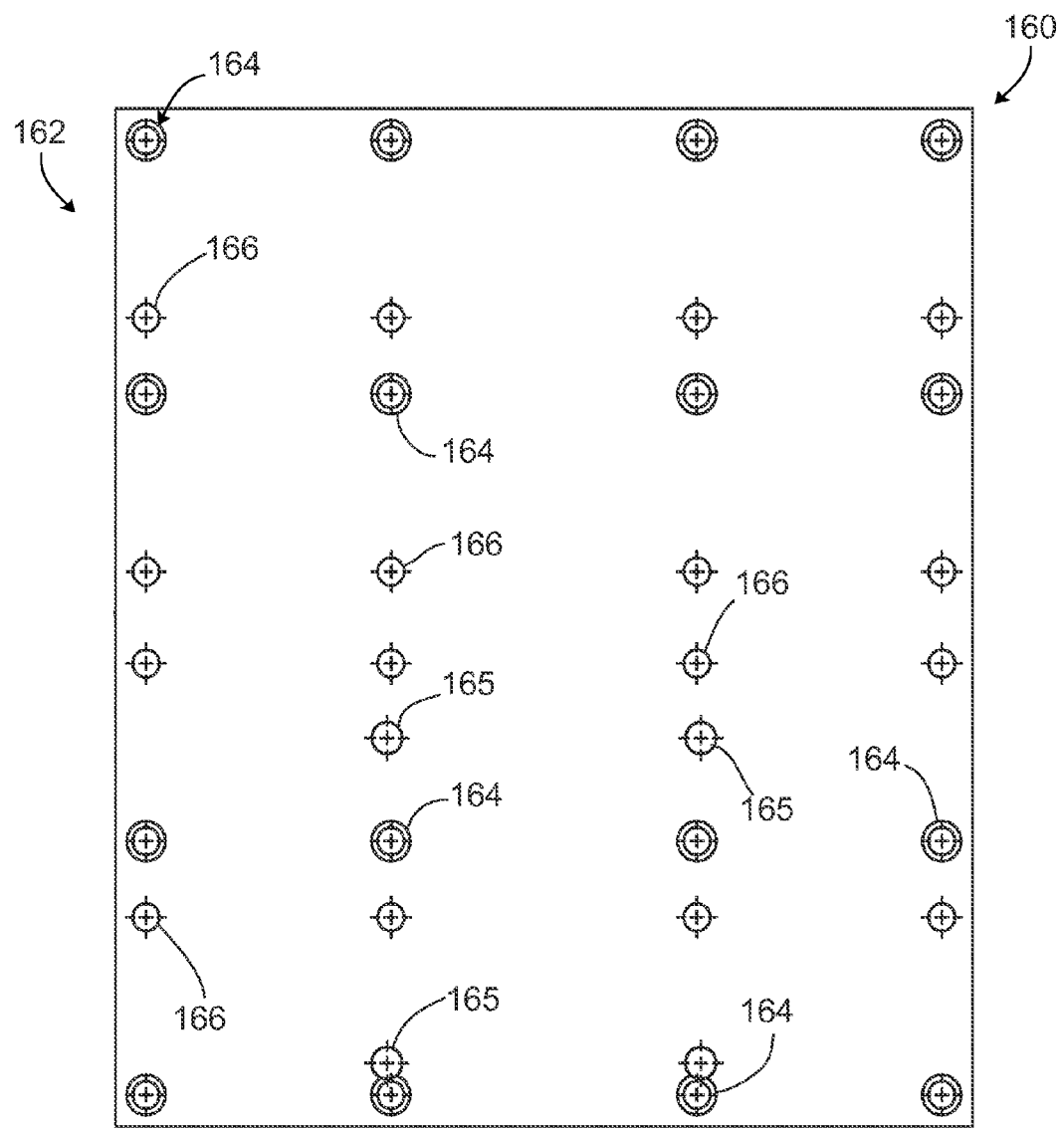
FIG. 6 is a top view of a modular connector bracket of the hybrid modular welding table.

FIG. 6 is a top view of a modular connector bracket 160 of the hybrid modular welding table 100. The modular connector bracket 160 allows connection of components to the hybrid modular welding table 100. In one embodiment, the modular connector bracket 160 may attach to the modular mounting brackets 128. The modular connector bracket 160 may be otherwise suitably attached to the hybrid modular welding table 100. In addition, the mounting, connecting and other brackets may be non-modular. The brackets may comprise plates, be generally or completely flat or level on a top and bottom, be squared at each edge and/or have other suitable configurations for mounting or connecting items.

Referring to FIG. 6, modular connector bracket 160 may comprise an array of holes 162 for connection of components to the hybrid modular welding table 100. In one embodiment, the array of holes 162 may comprise a first pattern of through holes 164 for a first type of connection and a second pattern of through holes 166 for a second type of connection. In the illustrated embodiment, the first pattern of through holes 164 may be comprised of sixteen through holes aligned in four rows of four. In this embodiment, the second pattern of through holes 166 may be comprised of sixteen through holes aligned in four rows of four. The first pattern of through holes 164 may be used to connect a component to a front or back of the frame assembly 102 as well as to store the modular connector bracket 160 to the front or back in the stored position. The second pattern of through holes 166 may be used to connect a component to a side of the frame assembly 102 as well as to store the modular connector bracket 160 to the side in the stored position. Additional through holes 165 may be provided for attaching equipment such as a vice. The through holes may each be the same or different sizes.

Exemplary spacing of the through holes 164 and 166 from left to right across the top of the illustrated modular connector bracket 160 is listed in Table 2. Exemplary spacing of the through holes 164 and 166 from bottom to top along the side of the illustrated modular connector bracket 160 is listed be in Table 3. In this embodiment, the modular connector bracket 160 may comprise a steel plate of 14 inches×16.05 inches. The modular connection bracket 160 may have other dimensions and/or be made of different materials. In addition, components may be otherwise connected to the hybrid modular welding table 100.

TABLE 2

| Hole Number | Location |
| --- | --- |
| #1 | .500 |
| #2 | 1.000 |
| #3 | 3.300 |
| #4 | 4.500 |
| #5 | 6.127 |
| #6 | 7.300 |
| #7 | 8.750 |
| #8 | 11.550 |
| #9 | 12.750 |
| #10 | 15.550 |

TABLE 3

| Hole Number | Location |
| --- | --- |
| #1 | .500 |
| #2 | 4.437 |
| #3 | 4.500 |
| #4 | 9.500 |
| #5 | 9.563 |
| #6 | 13.500 |

In the embodiment of FIG. 6, the through holes are each 0.438 inches in diameter, except the four additional equipment holes, which are each 0.500 inches in diameter. The through holes may additionally have other dimensions, be otherwise suitably spaced, and/or additional, other or fewer uses for storage or use on the modular connector plate 160.

Figure 7A:
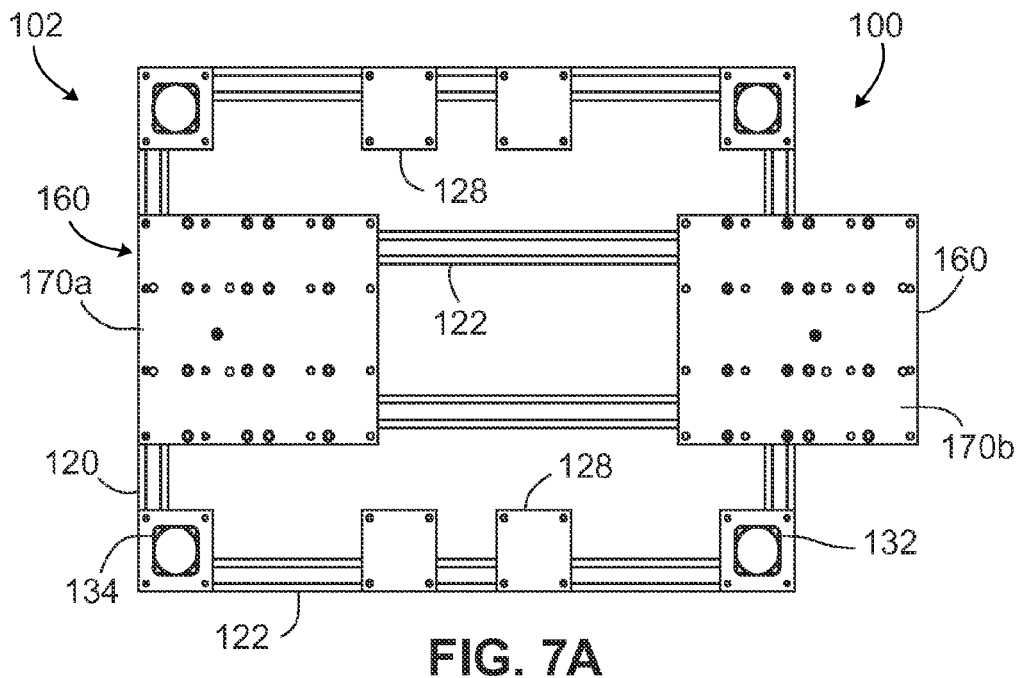
FIGS. 7A-7C are various views of the hybrid modular welding table with surface plates removed to show connection of modular connector brackets to the hybrid modular welding table.
Figure 7B:
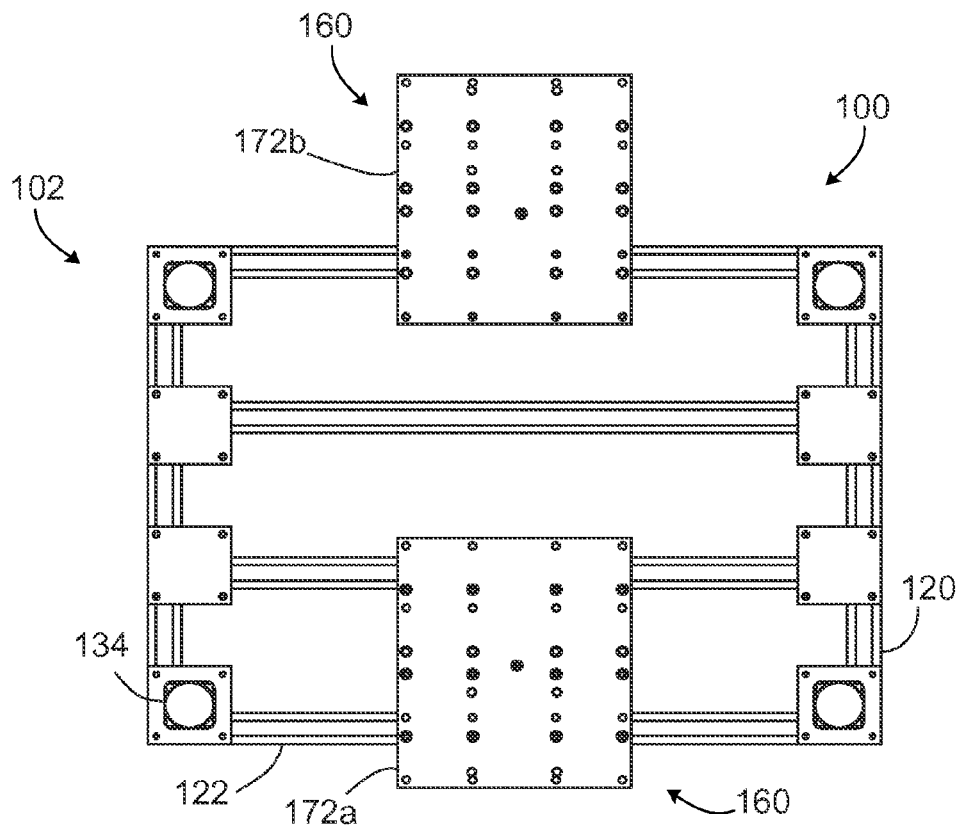
Figure 7C:
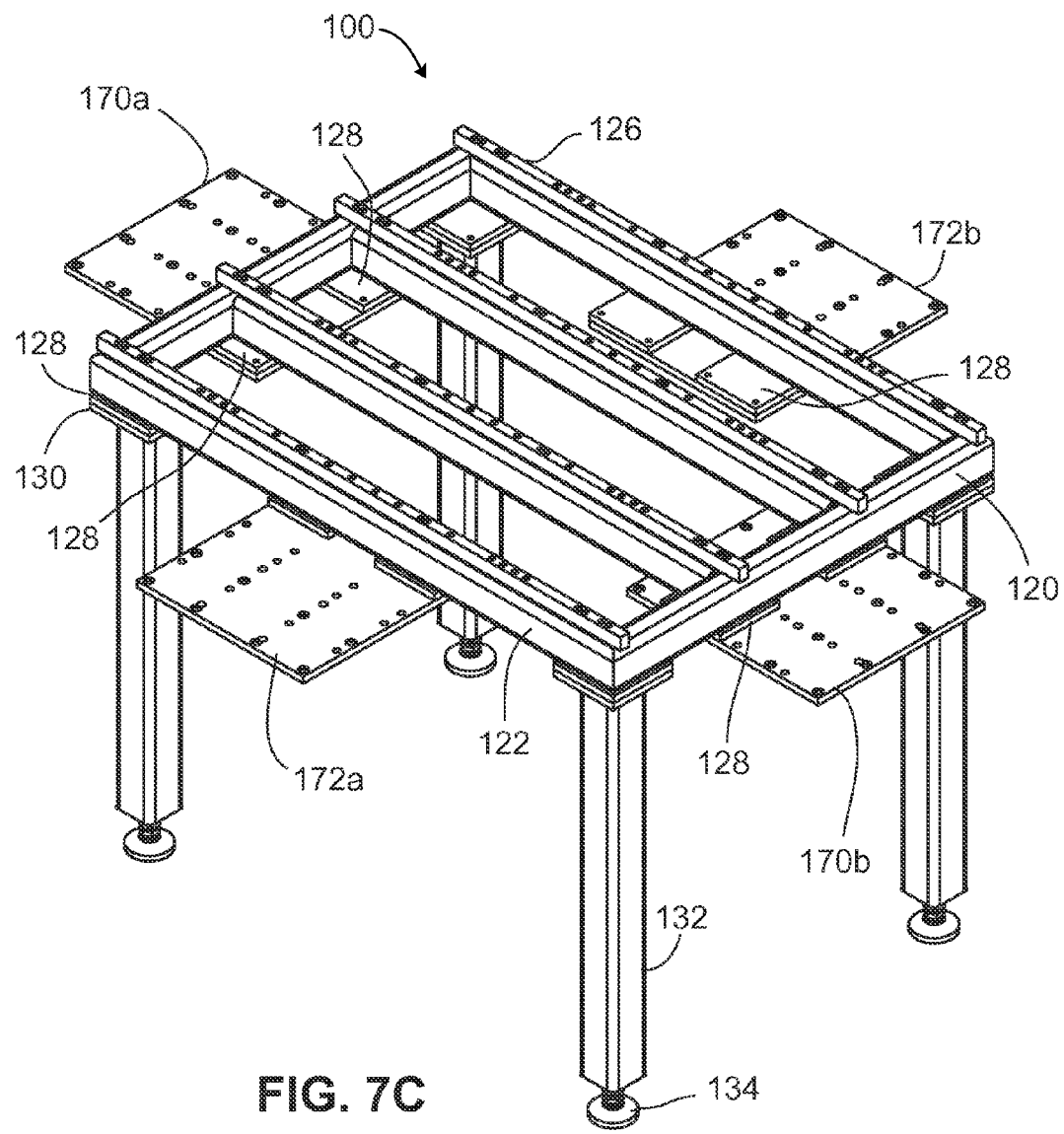

FIGS. 7A-7C are various views of the hybrid modular welding table 100 with the plates removed, showing connection of the modular connection brackets 160 to the hybrid modular welding table 100. In the illustrated embodiment, the modular connection brackets 160 are bolted to the hybrid modular welding table 100. The modular connection brackets 160 may be otherwise suitably attached or secured to the hybrid modular welding table 100.

Referring to FIG. 7A, which shows a bottom view of the hybrid modular welding table 100, the modular connection brackets 160 are used as side connection brackets 170*a* and 170*b*. In the illustrated embodiment, a first side connection bracket 170*a* is in a stored position not protruding outward from the edges of the frame assembly 102 while a second side connection bracket 170*b* extends outward from the edges of the frame assembly 102 for connection of one or more components.

Referring to FIG. 7B, which shows a bottom view of the hybrid modular welding table 100, the modular connection brackets 160 are used as front and back connection brackets 172*a* and 172*b*. In the illustrated embodiment, a front connection bracket 172*a* is in a stored position protruding slightly outward from the edges of the frame assembly 102 while a back side bracket 172*b* extends outward from the edges of the frame assembly 102 for connection of one or more components.

Referring to FIG. 7C, which shows an isomeric view of the hybrid modular welding table 100, a number of connection bracket locations are shown, including locations for side, front and back connection brackets 170*a-b* and 172*a-b*. In the illustrated embodiment, each of the connection brackets 170*a-b* and 172*a-b* are deployed to be accessible to attach or connect one or more components to the hybrid modular welding table 100.

Figure 8A:
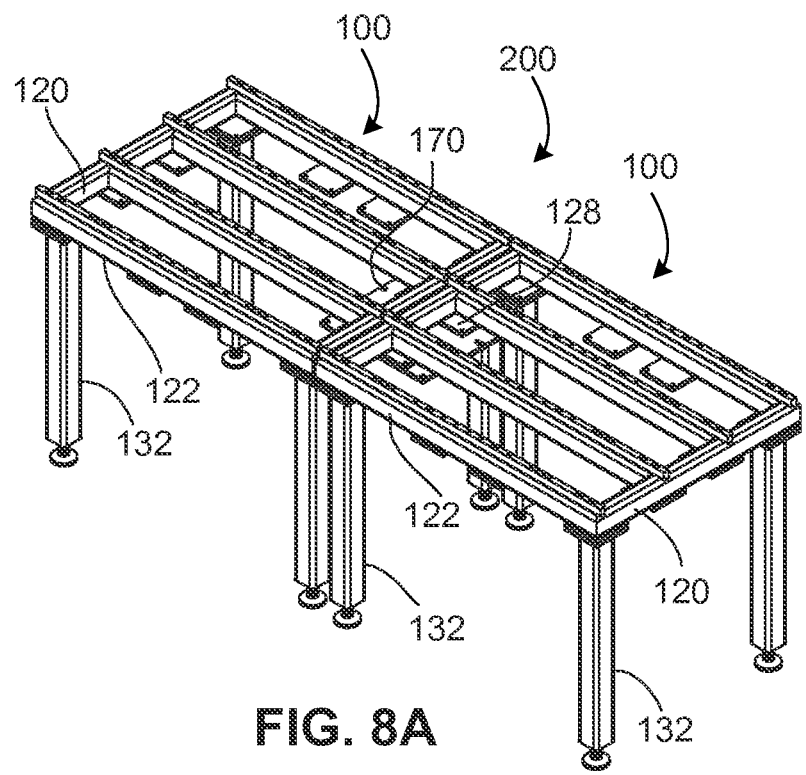
FIGS. 8A-8C are various views of an extended hybrid modular welding table with side connections.
Figure 8B:
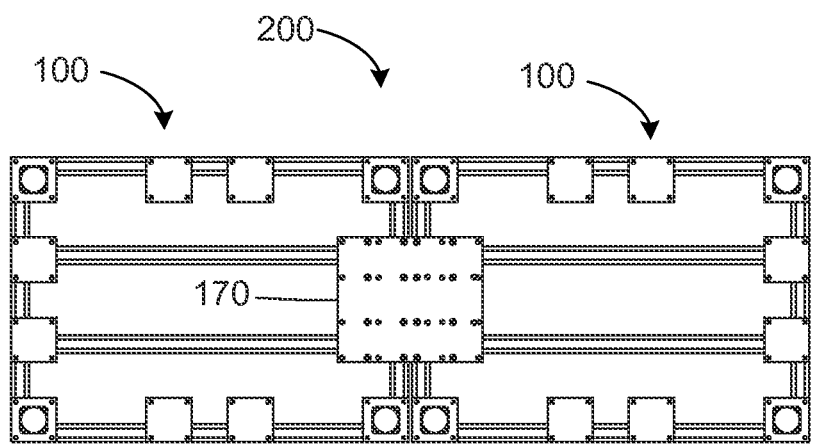
Figure 8C:
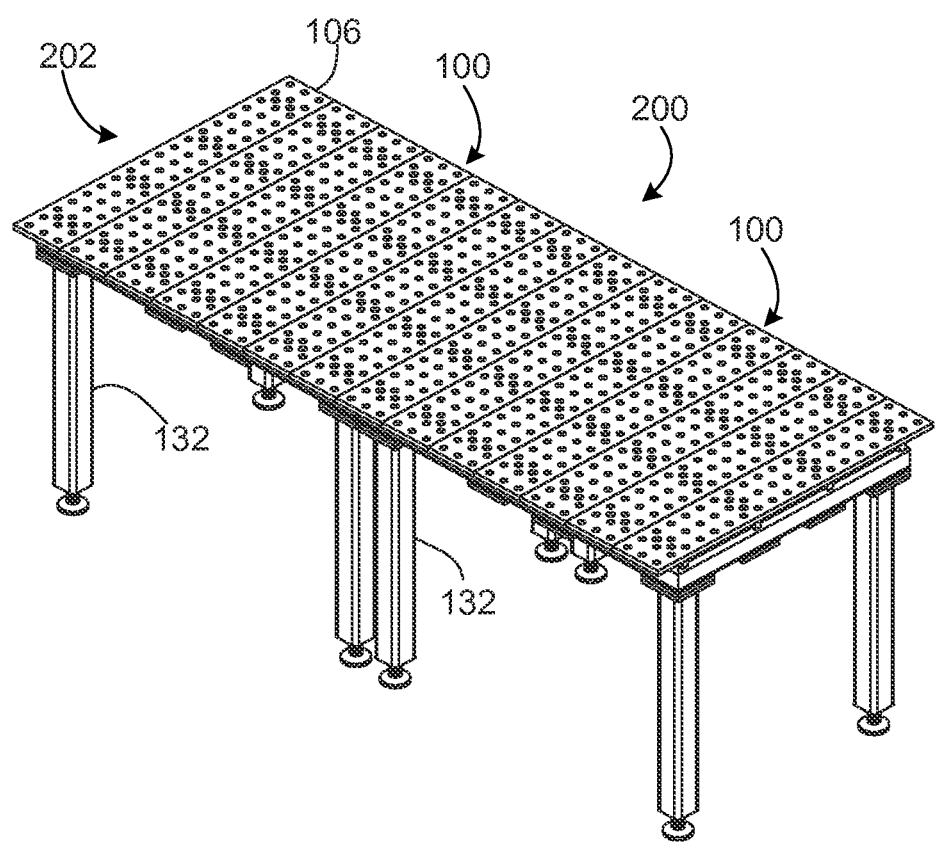

FIGS. 8A-8C are various views of an extended hybrid modular welding table 200 comprising two connected hybrid modular welding tables 100. The two hybrid modular welding tables 100 are each connected by a modular connector bracket 160 used as a side connector bracket 170. The two hybrid modular welding tables 100 may be bolted to the side connector bracket 170. Thus, the two hybrid modular welding tables 100 can be readily used as an extended table 200 when needed and separated when an extended table 200 is not needed.

Referring to FIGS. 8A-8C, the extended hybrid modular welding table 200 has an extended continuous working surface 202. The extended continuous working surface 202 may be a spaced or hybrid working surface as previously discussed. Further hybrid modular welding tables 100 may be attached to extended hybrid modular welding table 200 using additional modular side connector brackets 170 or front/back connector brackets 172.

Figure 9A:
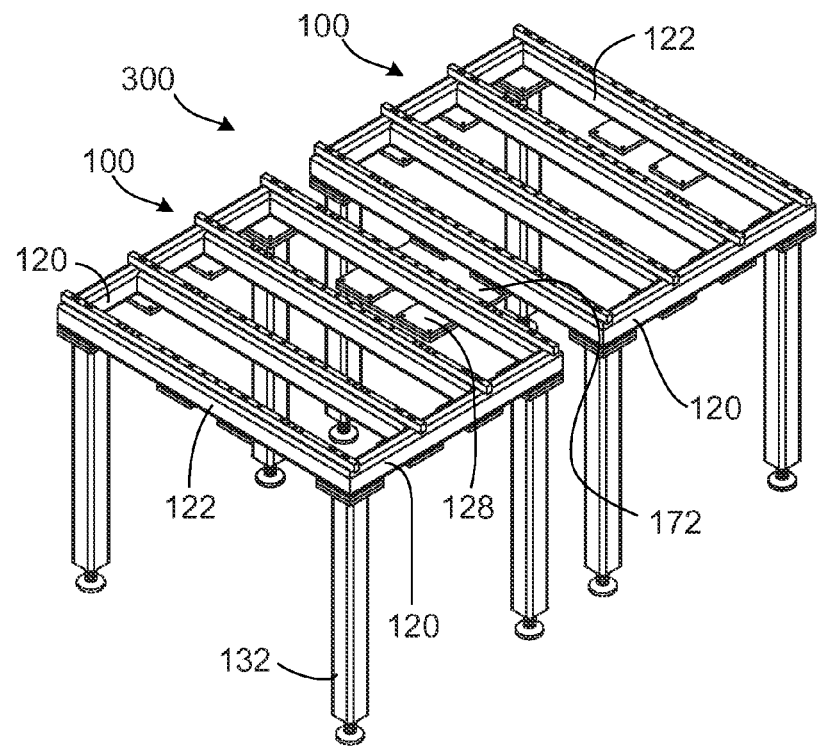
FIGS. 9A-9C are various views of an extended hybrid modular welding table with front and back connections.
Figure 9B:
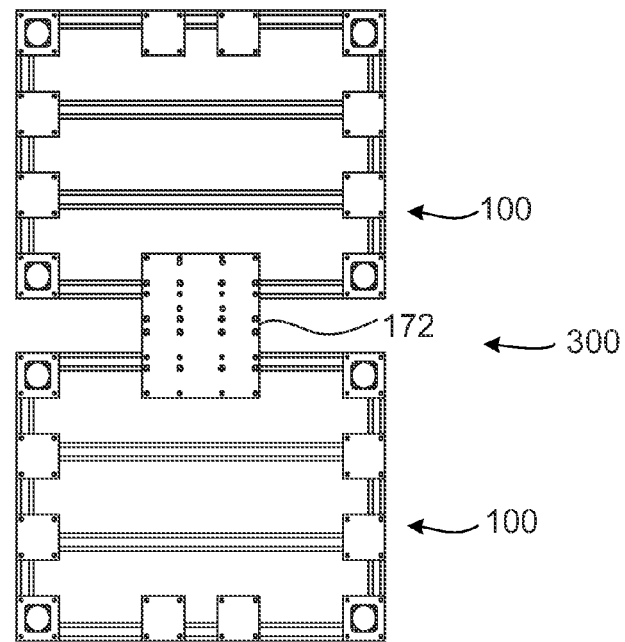
Figure 9C:
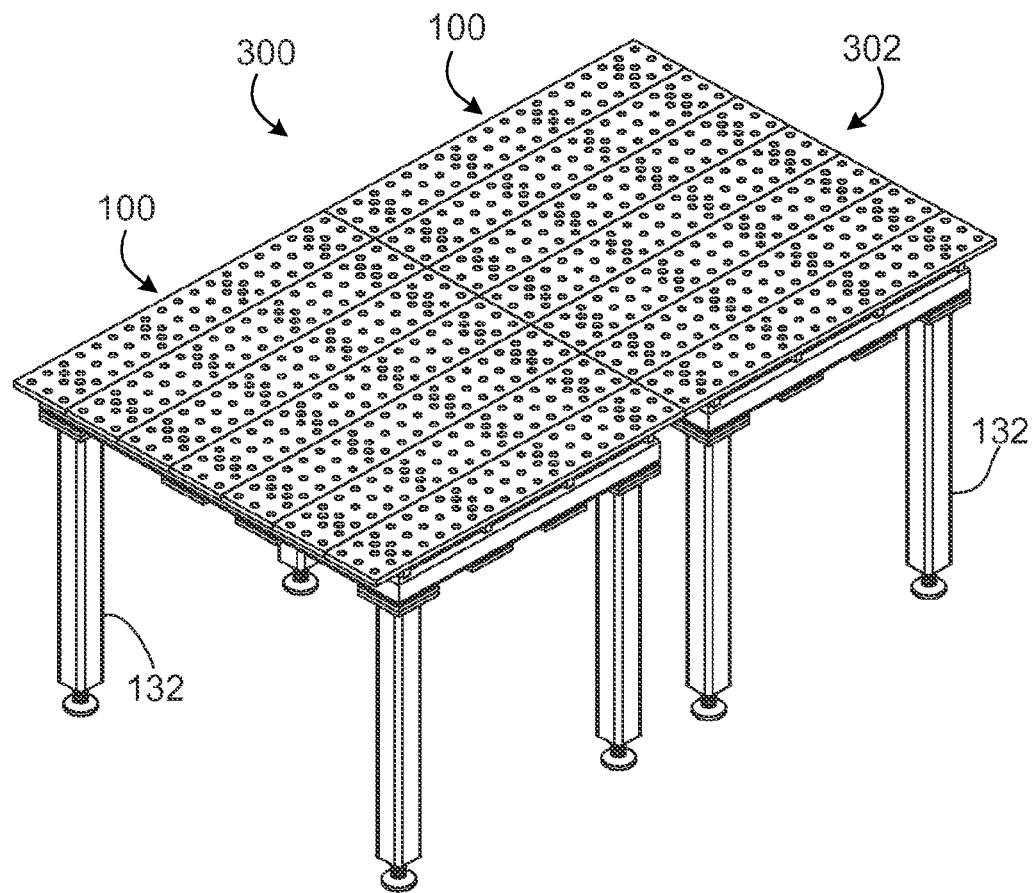

FIGS. 9A-9C are various views of an extended hybrid modular welding table 300 comprising two connected hybrid modular welding tables 100. The two hybrid modular welding tables 100 are each connected by a modular connector bracket 160 used as a front/back connector bracket 172. The two hybrid modular welding tables 100 may be bolted to the side connector brackets 172. Thus, the two hybrid modular welding tables 100 can be readily used as an extended table 300 when needed and separated when the extended table is not needed.

Referring to FIGS. 9A-9C, the extended hybrid modular welding table 300 has an extended working surface 302 that is continuous. The extended working surface 302 may be a spaced or hybrid working surface as previously discussed. Further hybrid modular welding tables 100 may be attached to the extended hybrid modular welding table 300 using additional front/back connector brackets 172 or side connector brackets 170. Thus, for example, the extended hybrid modular welding table 300 could be connected to the front, back or side of the extended hybrid modular welding table 200. In a particular embodiment, several or a series of welding tables may be connected or joined together, with or without gaps, to form a large scale fixturing platform for creating large scale fixtures and assemblies. In this embodiment, the connecting structures may comprise connector brackets as described, elongated or custom connector brackets, or connector brackets made from tubular material.

Figure 10A:
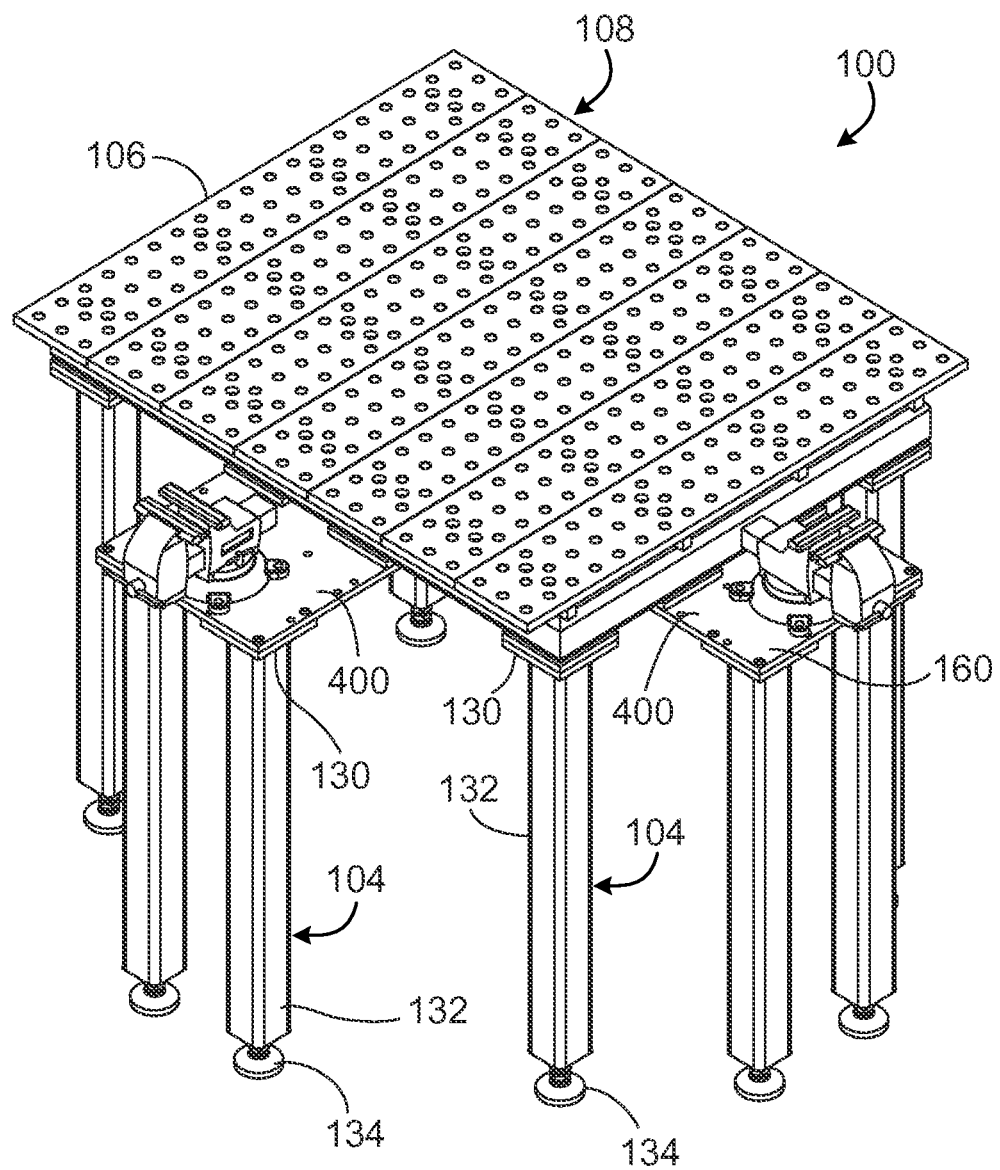
FIGS. 10A-10C are various views of the hybrid modular welding table with an off-table working surface.
Figure 10B:
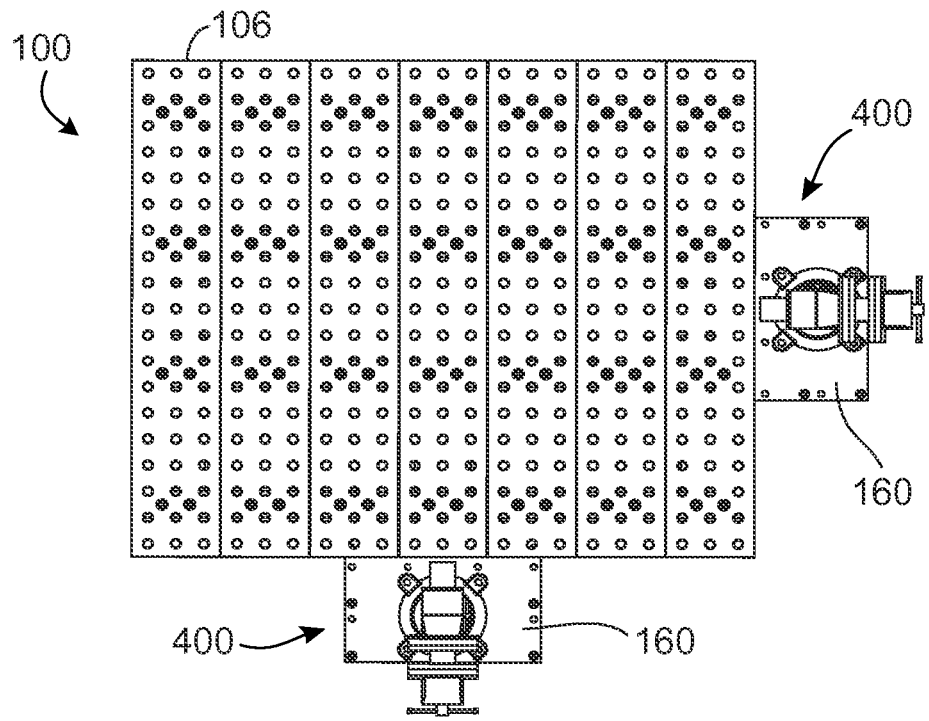
Figure 10C:
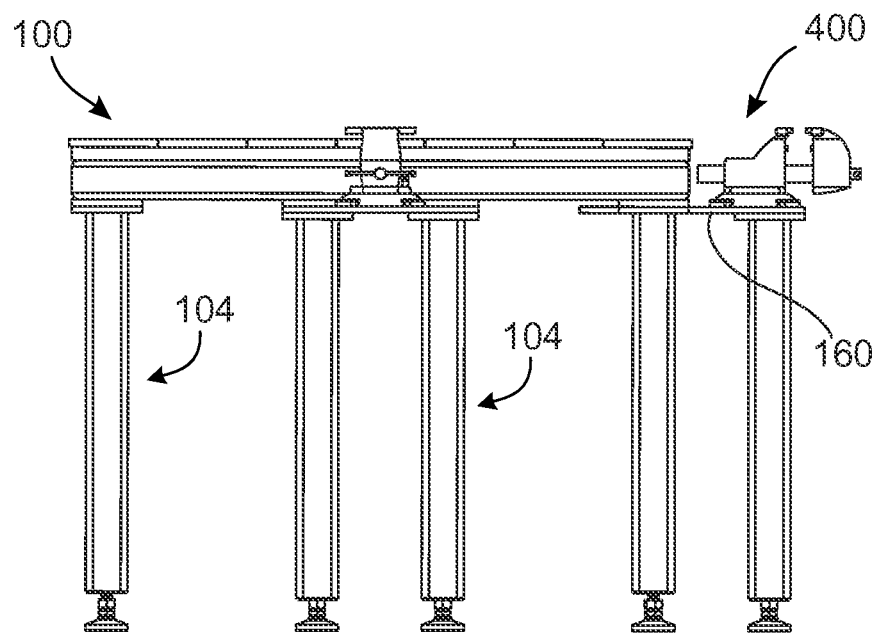
Figure 11A:
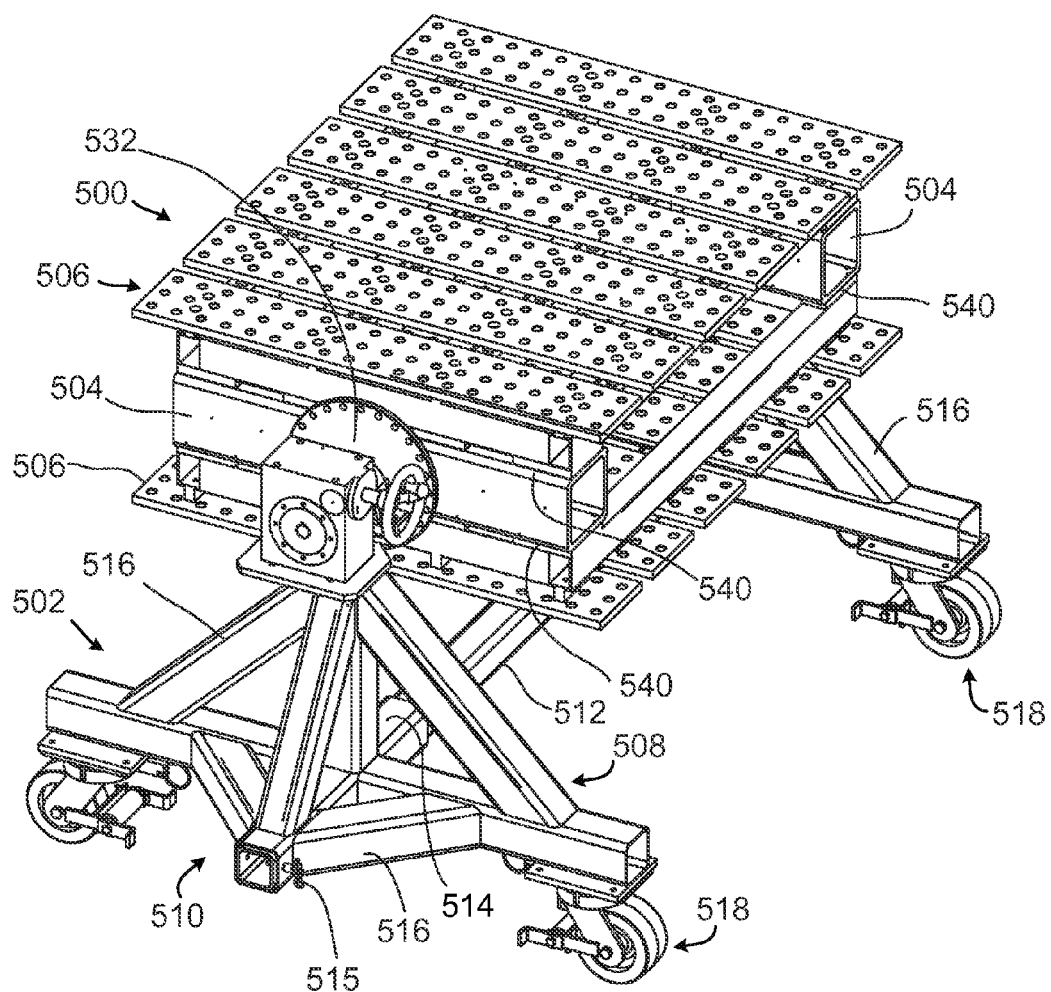
FIGS. 11A-11D are various views of a rotatable fixturing platform having a rotisserie and mounting frame supporting a plurality of hybrid modular welding tables.
Figure 11B:
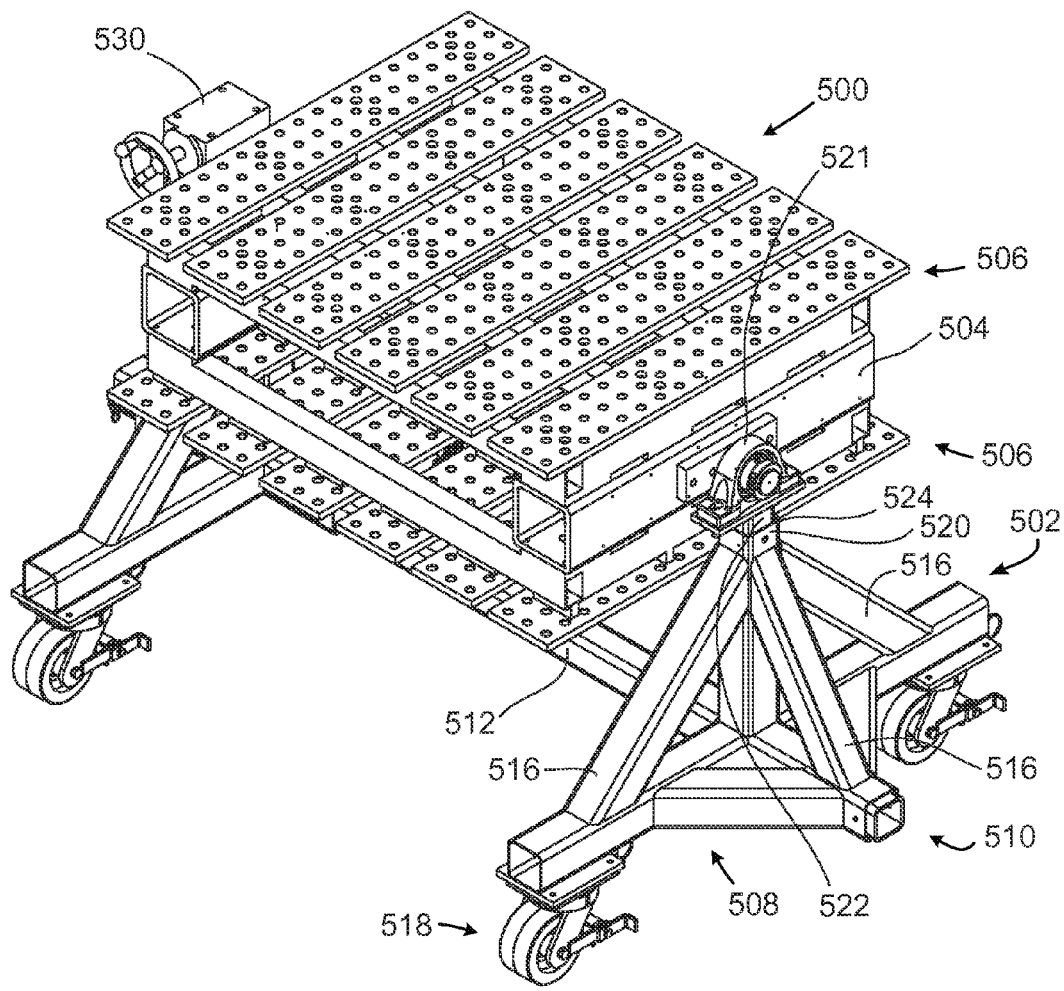
Figure 11C:
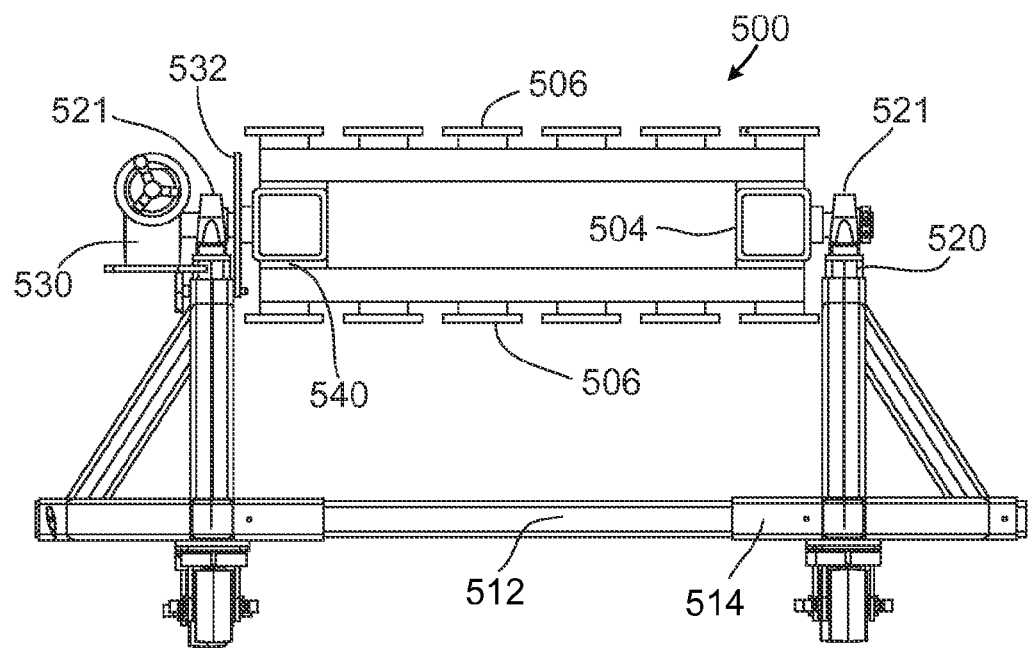
Figure 11D:
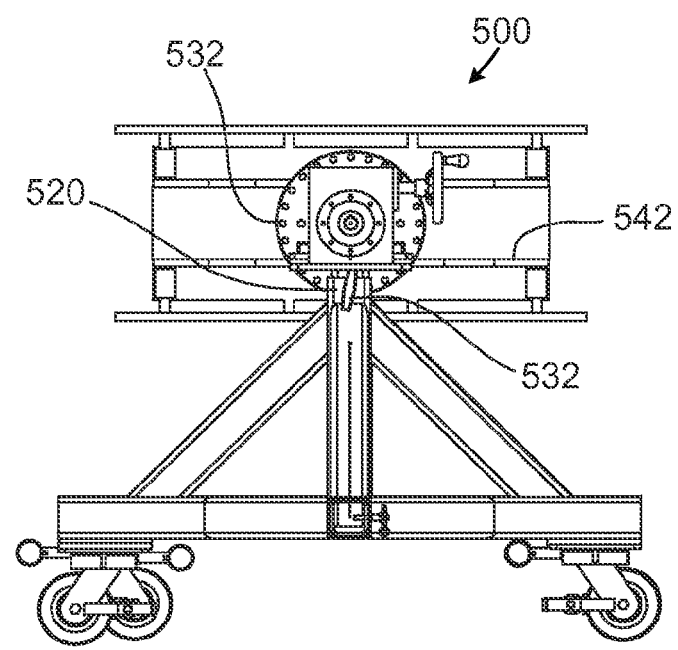

FIGS. 10A-10C are various views of the hybrid modular welding table 100 with a plurality of off-table working surfaces 400. In the illustrated embodiment, the off-table working surfaces 400 each comprise a modular connector bracket 160 deployed from the hybrid modular welding table 100. The off-table working surfaces 400 may extend from the front, back or sides of the hybrid modular welding table 100 and support or allow connection of an accessory such as a vice.

Referring to FIGS. 10A-10C, the modular connector brackets 160, when deployed on the off table working surface 400 may, if needed, be supported by one or more legs. In one embodiment, the modular connector brackets 160 are supported by leg assemblies 104. In this embodiment, the leg assemblies 104 may be modular in that the leg assemblies may be used without modification for supporting the frame assembly 102 and the modular connector brackets 160 of the off-table work surface 400. The foot 134 of the leg assembly 104 may allow any necessary height adjustment and leveling of the working surfaces 108.

FIGS. 11A-11D are various views of a rotatable fixturing platform 500 having a rotisserie 502 with a mounting frame 504 supporting a plurality of hybrid modular fixturing platforms 506. The rotisserie 502 may comprise a base 508 having a frame 510 which may be extensible to adjust length of the base 508. The extensible frame 510 may comprise a center frame member 512 received into mating receptacles 514. The center frame member 512 and mating receptacles 514 may comprise a square shape or may be keyed. The extensible frame 510 may be lengthened to preset lengths and secured using cotter pins and mating holes in the center frame member 512 and mating receptacles 514.

A plurality of vertical and horizontal struts 516 may be included to support the frame and to, for example, add stiffness. Casters 518 with brakes may be provided on a bottom of the extensible frame 510 to allow the rotatable fixturing platform 500 to be readily moved or transported. Other suitable designs may be used for the rotisserie 502, the frame 510, and frame elements.

The extensible frame 510 may also comprise extensible arms 520 supporting a bearing or other suitable assembly 521 allowing rotation of the mounting frame 504. The extensible arms 520 may each comprise a center arm member 522 received into mating receptacles 524. The center arm member 522 and mating receptacles 524 may each comprise, for example, a square shape or may be keyed. The extensible arms 520 may be lengthened to preset lengths and secured using cotter pins and mating holes in the center arm member 522 and mating receptacles 524.

A gear box 530 may rotate the mounting frame 504. In one embodiment, the mounting frame 504 may be rotated to preset positions and secured with a pin assembly 532. The mounting frame 504 and/or hybrid modular fixturing platforms 506 may be otherwise fixed, secured or held at a desired position.

The hybrid modular fixturing platforms 506 may each comprise the hybrid modular fixturing platform 100 described above. In this embodiment, the hybrid modular fixturing platforms 506 may comprise modular mounting brackets 540 to attach to the mounting frame 504 in place of leg assemblies using, for example, bolts or other fasteners. Thus, the fixturing platforms 506 may be readily removed, added or have their working surfaces reconfigured.

The fixturing platform or table of the disclosure may be assembled upon fabrication or shipped unassembled or partially assembled for assembly at, for example, a point of use or sale. In many cases, to reduce shipping volume, the fixturing platform or table may be shipped partially assembled with the parts fully fabricated and configured to be assembled. Thus, the parts such as the frame assembly 102 may be welded together and shipped assembled while other parts, such as un-welded parts that are fastened, are shipped unassembled with the assembled parts.

A number of embodiments of the invention have been described. Nevertheless, it will be understood that various modifications may be made without departing from the spirit and scope of the invention. For example, the specific dimensions described are exemplary and may be modified without departing from the scope of the disclosure. In addition, for example, the frame, leg, support, plates and brackets may comprise tubular, solid or other suitable structures. Accordingly, other embodiments are within the scope of the following claims.

What is claimed is:

1. A fixturing platform, comprising:
   a frame assembly configured to couple to a support assembly, the frame assembly comprising:
   a frame, and
   a plurality of modular mounting brackets interchangeable without modification, the modular mounting brackets configured to couple the frame to the support assembly;
   a plurality of surface plates configured to couple to the frame assembly in a plurality of configurations, the plurality of configurations comprising at least a continuous configuration with abutting surface plates forming a continuous working surface and a spaced configuration with spaced surface plates forming a spaced working surface, the spaced configuration have one or more working gaps between surface plates; and
   the support assembly comprising: configured to secure to the frame assembly at a respective plurality of attachment points, the plurality of leg assemblies comprising:
   a plurality of legs,
   a plurality of modular leg mounting brackets attached to the respective plurality of legs, each modular leg mounting bracket attached to a modular mounting bracket to secure the plurality of legs to the frame assembly at a corresponding attachment point.

2. The fixturing platform of claim 1, the plurality of configurations further comprising a hybrid configuration with a plurality of abutting surface plates and at least one spaced surface plate forming a hybrid working surface.

3. The fixturing platform of claim 1, the frame assembly comprising a plurality of bars configured to extend from at least proximate to a first edge of the frame assembly to at least proximate to a second edge of the frame assembly opposite the first edge, the surface plates configured to be coupled to the bars.

4. The fixturing platform of claim 3, the surface plates configured to be coupled to the bars at discrete locations along the bars.

5. The fixturing platform of claim 3, the bars comprising continuous bars.

6. The fixturing platform of claim 5, the surface plates configured to be coupled to the continuous bars at any location along at least a majority of the length of the continuous bars.

7. The fixturing platform of claim 5, the surface plates each coupled to a plurality of slidable brackets each having a fastener, each slidable bracket and fastener configured to clamp to the continuous bars to lock in place.

8. The fixturing platform of claim 5, the continuous bars configured to extend longitudinally across the frame assembly and comprising a plurality of threaded holes configured to receive fasteners to secure the surface plates to the frame assembly in the plurality of configurations.

9. The fixturing platform of claim 8, at least a subset of the threaded holes used for multiple ones of the plurality of configurations.

10. The fixturing platform of claim 1, the leg assemblies each rigidly secured to the frame assembly with bolts at each of four attachment points.

11. The fixturing platform of claim 1, further comprising a modular connector bracket, the frame assembly comprising one or more of the plurality of modular mounting brackets configured to couple the frame to the modular connector bracket.

12. The fixturing platform of claim 11, the modular connector bracket configured to be coupled to the frame in a stored position and in a deployed position with the one or more modular mounting brackets.

13. The fixturing platform of claim 12, the modular connector bracket configured to form in the deployed position an off-table surface coupled to the working surface, further comprising at least one leg assembly configured to be coupled to the modular connector bracket to support the off-table surface.

14. The fixturing platform of claim 1, the fixturing platform comprising a welding table, and further comprising a modular connector bracket configured to connect in the deployed position to one or more welding tables.

15. The fixturing platform of claim 9, further comprising a modular connector bracket for each of a plurality of edges of the frame assembly, the modular connector brackets interchangeable without modification, the frame assembly comprising for each of the plurality of edges one or more modular mounting brackets configured to couple the edge to the modular connector bracket.

16. A welding table, comprising:
a frame assembly comprising:
  a frame, and
  a plurality of modular mounting brackets interchangeable without modification, the plurality of modular mounting brackets configured to couple the frame to a plurality of leg assemblies and to a plurality of modular connector brackets in a stored position and in a deployed position, each of the plurality of leg assemblies comprising a leg and a leg mounting bracket attached to the leg and to one of the plurality of modular mounting brackets to secure the leg to an attachment point on the frame assembly;
a plurality of surface plates configured to couple to the frame assembly, the surface plates comprising a plurality of fixturing holes; and
the modular connector brackets interchangeable without modification and configured to connect a plurality of off-table components to the welding table, the plurality of off-table components comprising another welding table to form an extended welding table and at least one leg assembly to provide a rigid off-table working surface.

17. A welding table, comprising:
a frame assembly comprising:
  a frame,
  a plurality of continuous bars welded to the frame, and
  a plurality of modular mounting brackets welded to the frame, the modular mounting brackets interchangeable without modification;
a plurality of leg assemblies each removably fastened to one of the modular mounting brackets at a plurality of attachment points, each leg assembly comprising:
  a leg, and
  a leg mounting bracket attached to the leg and to one of the plurality of modular mounting brackets to secure the leg to an attachment point on the frame assembly;
a plurality of modular connector brackets each removably fastened to one or more of the modular mounting brackets, the modular connector brackets interchangeable without modification;
the modular connector brackets configured to connect a plurality of off-table components to the welding table; and
a plurality of surface plates removably fastened to the plurality of continuous bars, the surface plates configured to rigidly connect to the continuous bars in a plurality of configurations, the plurality of configurations comprising a continuous configuration with abutting surface plates forming a continuous working surface, a spaced configuration with spaced surface plates forming a spaced working surface, and a hybrid configuration with a plurality of abutting surface plates and at least one spaced surface plate forming a hybrid working surface.

* * * * *